United States Patent [19]
Payne et al.

[11] 3,726,929
[45] Apr. 10, 1973

[54] PROCESS FOR THE PRODUCTION OF DIHALOPHENOLS

[75] Inventors: Kenneth Richard Payne; Malcolm Howard Milnes, both of Chesterfield, England

[73] Assignee: Coalite and Chemical Products Limited, Bolsover, near Chesterfield, Derbyshire, England

[22] Filed: Feb. 7, 1969

[21] Appl. No.: 797,664

[30] Foreign Application Priority Data

Feb. 9, 1968 Great Britain....................6,574/68

[52] U.S. Cl. .............................................260/623 R
[51] Int. Cl................................................C07c 39/30
[58] Field of Search...................260/623, 629, 623 R

[56] References Cited

UNITED STATES PATENTS

| | | | |
|---|---|---|---|
| 2,769,833 | 11/1956 | Weil | 260/473 |
| 2,708,209 | 5/1955 | Nicolaisen et al | 260/623 R |
| 2,803,670 | 8/1957 | Galat | 260/623 R |
| 2,952,702 | 9/1960 | Galat | 260/623 R |
| 3,417,150 | 12/1968 | Bondy et al | 260/623 R |
| 3,481,991 | 12/1969 | Cohen | 260/623 R |

*Primary Examiner*—Bernard Helfin
*Assistant Examiner*—W. B. Lone
*Attorney*—Zabel, Baker, York, Jones & Dithmar

[57] ABSTRACT

Dihalophenols are produced by the alkaline hydrolysis of trihalobenzenes in an organic solvent. The process is effected in the presence of a hydrocarbon effective to entrain reaction water or hinder sublimation of the trihalobenzene, and/or the said solvent is a $C_2 - C_4$ glycol which is removed from the reaction mixture before the dihalophenols are liberated.

2 Claims, No Drawings

PROCESS FOR THE PRODUCTION OF DIHALOPHENOLS

The invention relates to a process for the production of dihalophenols.

According to the invention, a process for the production of a dihalophenol comprises subjecting a trihalobenzene to alkaline hydrolysis at elevated temperature in an organic solvent and in the presence of an additive which is a hydrocarbon or hydrocarbon fraction effective to entrain reaction water and/or hinder sublimation of the trihalobenzene.

The organic solvent in which the hydrolysis is effected is advantageously one which is normally liquid at the temperature at which the hydrolysis is effected. The preferred solvent is a glycol.

According to the invention furthermore, a process for the production of a dihalophenol comprising subjecting a trihalobenzene to alkaline hydrolysis at elevated temperature in an organic solvent comprising a gylcol containing from 2 to 4 carbon atoms in the molecule, and recovering glycol from the reaction mixture before liberating dihalophenol.

The trihalobenzene is preferably a trichlorobenzene and the hydrolysis is suitably at a temperature in the range 130° – 200°C, advantageously at a temperature above 160°C and preferably at a temperature in the range 160°–185°C.

The alkaline material used in the hydrolysis is preferably an alkali metal hydroxide, for example sodium hydroxide or potassium hydroxide. The alkali metal hydroxide is preferably present in an amount of from 2 to 3 moles per mol of the trihalobenzene.

The preferred glycol is ethylene glycol, but it may be diethylene glycol, propylene glycol or a butylene glycol. The mol ratio of glycol to trihalobenzene is advantageously not less than 1.5 and is suitably not greater than 15, the preferred mol ratio being within the range 3–8.

Some evidence has been found that the glycol actually participates in the reaction. Thus, for example, with the use of ethylene glycol a dichlorophenoxyethanol is formed as an intermediate, probably after the formation of the mono-sodium or other alkali metal derivative of the glycol. The dichlorophenoxy intermediate then either rearranges or reacts further to give an alkali metal dichlorophenate. However, the bulk of the ethylene glycol, at least when used in a molar ratio of not less than 1.5 to the trihalobenzene, does not react but functions as a solvent.

The additive which entrains or forms an azeotrope with water and/or hinders sublimation of the trihalobenzene at a temperature at which the hydrolysis is effected, is preferably a petroleum fraction or distillate. Such fractions are variously known as petroleum ethers, special boiling point spirits or white spirits but are hereinafter designated by the term petroleum ether. The additive will have an appropriate boiling range, for example, a boiling range of 140° – 160°C, or 145° – 165°C, or 150° – 170°C or its boiling range may be somewhat higher or lower. The amount of petroleum ether employed, when that entrained with the water during the course the reaction is returned to the reaction mixture, is suitably from 4 to 20 parts by weight per 100 parts by weight of the trihalobenzene.

At the end of the reaction, the glycol is preferably recovered by vacuum distillation. The petroleum ether, any unreacted trihalobenzene and any residual water distil first, followed by the glycol. In one preferred method, the reaction mixture is cooled to a temperature in the range 80° – 100°C and the pH of the mixture is lowered slightly, as for example, to 11 - 13.5 and preferably to 12.5 – 13, or to a slightly lower value if desired. The pressure on the mixture is progressively reduced and the temperature progressively increased until the petroleum ether, unconverted trihalobenzene and residual water are removed. The progressive increase of temperature and the progressive increase of vacuum are continued in order to take off and recover the glycol.

The residue consists largely of dihalophenates. The residue is acidified, preferably after dilution with water, to liberate the dihalophenol or dihalophenols.

The dihalophenol product may then be washed and afterwards fractionally distilled when more than one dihalophenol is present. Fractional crystallization may also be used to separate dihalophenols and the dihalophenols may be further purified by recrystallization from a suitable solvent, for example, petroleum ether.

The recovery of the glycol in the manner described is more advantageous than a method in which the reaction mixture is, after removal of the petroleum ether and any unreacted trihalobenzene, fully acidified to liberate the dihalophenol product before the glycol is recovered. In the latter case, stratification of the acidified product will find the glycol in the aqueous layer together with the salt, formed upon acidification, which aqueous layer containing salt must then be worked up to recover the glycol. The recovery of the glycol by distillation before the reaction mixture is fully acidified to liberate the dihalophenols is simpler and it has the further advantage that loss of dihalophenol by dissolution in the aqueous glycol layer cannot occur.

The invention is illustrated in the following examples in which the parts are by weight. The petroleum ether used in the examples had a boiling range of 140° – 160°C unless otherwise stated.

EXAMPLE 1

226 parts 1,2,4-trichlorobenzene, 16 parts petroleum ether, 388 parts ethylene glycol and 125 parts of caustic soda were charged to a vessel provided with a stirrer and a device for removal of water. The mixture was heated up and water was evolved from 160°C upwards, the water being entrained by the petroleum ether. The water was removed from the system and the petroleum ether was returned to the reactor. When the temperature had reached 180°C substantially all the water had been removed, but the mixture was maintained at that temperature for four hours to permit transformation of the dichlorophenoxyethanols to sodium dichlorophenates.

The temperature of the reaction mixture was then allowed to fall to 90°C and the pH of the contents of the vessel was adjusted to 12.5 by the addition of 47 parts of brown oil of vitriol (78 percent $H_2SO_4$). The pressure in the vessel was then reduced to 200 mms Hg and progressively reduced while the temperature was increased; at a vapor temperature of 95°C and a total pressure of 150 mms all residual water and the petroleum ether plus unreacted 1,2,4-trichlorobenzene had been removed. The distillate was then taken off into a new receiver and distillation was complete at a vessel temperature of 170°C at a pressure of 5 mms. Analysis of the so-recovered glycol (229parts) showed it to be 95percent glycol, 5 percent diethylene glycol. This represents a recovery of 59.1 percent by weight.

The deglycolated reaction product was then cooled to 100°C and 660 parts of water were added with stirring. Acidification was then completed by adding 77 parts of 78 percent $H_2SO_4$, and the system was allowed to stratify at 90° – 95°C. The lower, phenolic layer was separated, and the upper, aqueous layer was run to waste. The lower layer was returned to the vessel and washed with 170 parts of water. The phenolic product was then run off and the dissolved water distilled off to give 196 parts of product containing 63.7 percent of 2,5-dichlorophenol, 11.1 percent of 2,4-dichlorophenol and 4.8 percent of 3,4-dichlorophenol.

Vacuum fractionation of this material gave 140 parts of a distillate which was a mixture of 2,5- and 2,4-dichlorophenols in the proportions 83:17 which was crystalline solid M.P. 41° C. crystallization of this material from 168 parts of petroleum ether (boiling range 80° – 100°C) gave 98 parts of 2,5-dichlorophenol M.P. 56° C, purity 98 percent.

Recovery of unreacted 1,2,4,-trichlorobenzene from the water / petroleum ether / 1,2,4,-trichlorobenzene mixtured removed prior to the glycol recovery gave 19 parts, making a total of 207 parts of 1,2,4-trichlorobenzene reacted, a conversion of 91.7 percent.

EXAMPLE 2

472 parts of 1,2,3-trichlorobenzene, 805 parts of ethylene glycol, 260 parts of caustic soda and 40 parts of petroleum ether were reacted in a manner similar to that described in Example 1.

No unreacted 1,2,3-trichlorobenzene was detected in the distilled petroleum ether collected after the reaction, so that the conversion was 100 percent. 466 parts of glycol, 5 percent of which was diethylene glycol, were obtained in the distillation, of 58% by weight. The washed, dehydrated product obtained after final acidification comprised 445 parts containing 53.4 percent of 2,6-dichlorophenol and 34.5 percent of the 2,3-isomer. Vacuum fractionation of that product yielded 152 parts of 2,6-dichlorophenol M.P. 65°C, purity 96 percent 118 parts of 2,3-dichlorophenol M.P. 56°C, purity 98 percent, and 138 parts of a 2,3/2,6-dichlorophenol intercut which was worked up by crystallization from petroleum ether.

EXAMPLE 3

50 parts 1,3,5-trichlorobenzene, 100 parts ethylene glycol, 27 parts caustic soda and 5 parts of petroleum ether were reacted under the same conditions as in Example 1 and 2. The petroleum ether distillate following the reaction contained 15.1 parts of 1,3,5-trichlorobenzene, representing a conversion of 34.9 parts of 69.8 percent. The recovery of glycol by distillation yielded 60 parts (5 percent diethylene glycol), a recovery by weight of 60 percent.

The washed, dehydrated product comprised 25.6 parts of which 71 percent was 3,5-dichlorophenol. This crude material was flash distilled, and the distillate (18 parts) was recrystallized from petroleum ether (80° – 100°C) to give 14 parts of 3,4-dichlorophenol M.P. 65°C, purity 95 percent.

EXAMPLE 4

A series of experiments was carried out as described in the preceding Examples, and the following average results were obtained.

| Trichlorobenzene isomer used | % Conversion | Products expressed as molar yield based on trichlorobenzene reacted |
|---|---|---|
| 1,2,4- | 93 | 2,5-dichlorophenol, 66% 2,4-dichlorophenol, 12% 3,4-dichlorophenol, 6% |
| 1,2,3- | 97 | 2,6-dichlorophenol, 51% 2,3-dichlorophenol, 36% |
| 1,3,5- | 70 | 3,5-dichlorophenol, 60% |

Glycol recovery in all experiments was between 55 and 60 percent of the quantity charged, the glycol recovered always containing 5 percent diethylene glycol. Recycle of this crude glycol in later experiments gave yields of dichlorophenols which were equally as good as those obtained with pure material, but slightly reduced yields of recovered glycol.

We claim:

1. A process for the production of a dichlorophenol, which comprises subjecting a trichlorobenzene to hydrolysis by maintaining a mixture of alkali metal hydroxide, a glycol containing from two to four carbon atoms in the molecule, a petroleum ether boiling in the range 140°–160°C as a water entrainer, and the trichlorobenzene at a temperature in the range 130°–200°C to form dichlorophenate and a reaction product of the alkali metal hydroxide and the glycol, thereafter lowering the pH of the hydrolysate to a value which is within the range of 11-13.5, distilling the hydrolysate to take the glycol overhead and then acidifying the distillation residue to liberate dichlorophenol.

2. A process according to claim 1 in which the glycol is ethylene glycol, from 3–8 mols of the glycol are used per mol of trichlorobenzene, and 4–20 parts by weight of petroleum ether are employed per 100 parts by weight of the trichlorobenzene.

* * * * *